Figure 1:
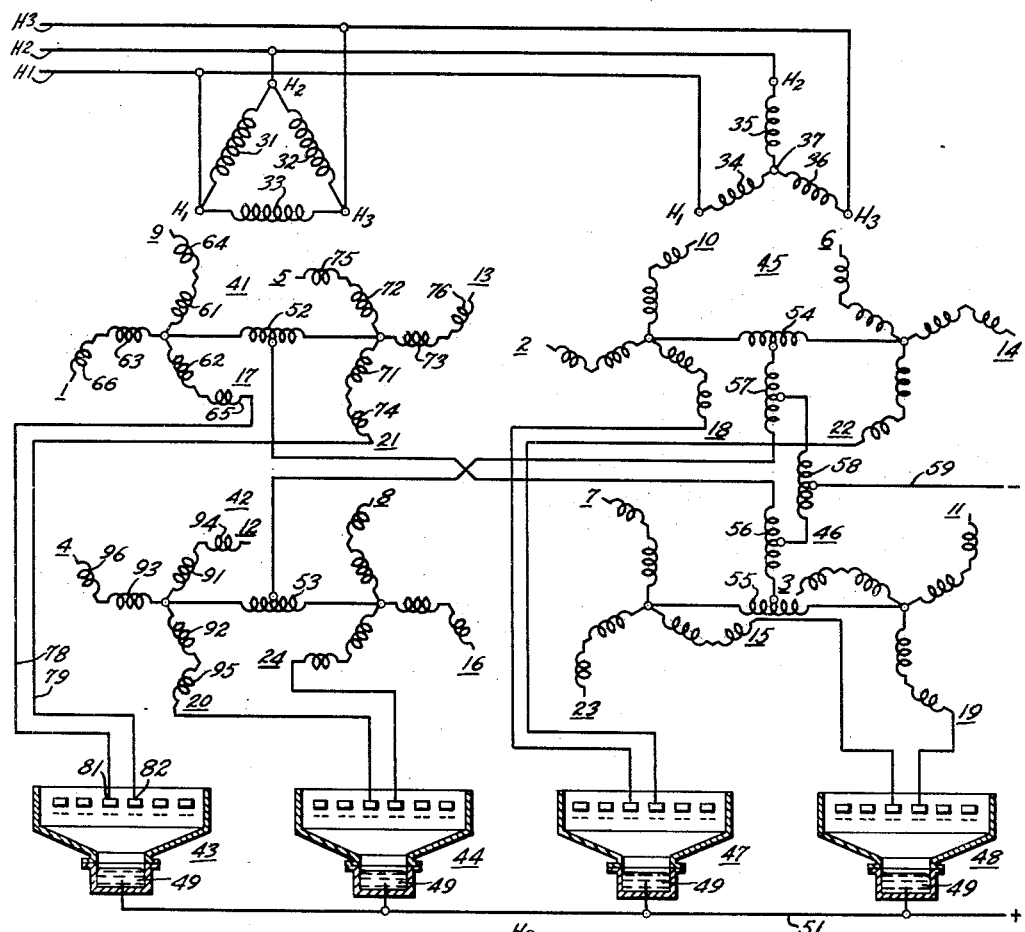

Jan. 5, 1943.   A. J. MASLIN ET AL   2,307,527
ELECTRICAL INDUCTION APPARATUS
Filed May 21, 1941

WITNESSES:
E. F. Oberheim.
Dw. E. Groome

INVENTORS
Albert J. Maslin and
Gordon F. Jones.
BY
Franklin E. Hardy
ATTORNEY

Patented Jan. 5, 1943

2,307,527

UNITED STATES PATENT OFFICE 2,307,527

ELECTRICAL INDUCTION APPARATUS

Albert J. Maslin, Sharon, and Gordon F. Jones, Irwin, Pa., assignors to Westinghouse Electric & Manufacturing Company, East Pittsburgh, Pa., a corporation of Pennsylvania Application May 21, 1941, Serial No. 394,494

2 Claims. (Cl. 172—238)

My invention relates to an arrangement of the connections of polyphase transformers for supplying power to a plurality of rectifier anodes.

It has been proposed to provide a battery of transformers for supplying electric energy to a plurality of rectifier anodes, say 24 anodes. The anodes may be associated with a 24-phase rectifier, or, as is usual, there may be provided a plurality of rectifiers, say four in number, each supplied with power from a common alternating-current power circuit through a set of transformer windings individual to the rectifier unit. The connections of the several transformers that feed the corresponding several rectifiers are so adjusted that the anode potentials of the transformers are displaced with respect to each other by 0, ±15 and 30°. To accomplish this phase displacement, it is customary to connect the primary winding of the first transformer in Y, the next two in oblique zigzag Y with a ±15° phase shift, and the last in delta. The secondary winding of each transformer is connected to supply an individual six-phase rectifier unit.

It has also been proposed to provide an electrical transformer system requiring a relatively large number of primary windings connected in delta and Y and secondary windings connected in various combinations of simple Y or delta and zigzag Y connections.

In accordance with the invention, as applied to a rectifier transformer system having 24 phase secondary conductors, two transformers are provided, one having a delta connected primary and the other a Y connected primary. Each transformer is provided with four zigzag connected three-phase low-voltage windings. These two transformers may be built on two separate three-phase cores, or on a single composite core having six winding leg members connected by three yoke members. In addition to the transformer windings mentioned above, a system of interphase transformers may be used to connect the neutral points of the several three-phase secondary windings together and to the negative supply conductor.

The zigzag connected secondary windings may be wound to provide either a 7½° or a 22½° phase displacement in voltage with respect to the phase of the voltage in the part of the winding connected to the neutral. In the illustration of the application of the invention in the accompanying drawing, the 22½° displacement is used.

An object of the invention is the provision of a simplified transformer connection for supplying alternating-current power through a plurality of reactor units that results in a plurality of secondary phase voltages having the maximum symmetry, and requiring the minimum amount of auxiliary apparatus while retaining the advantages of multiple three-phase operation.

A more specific object of the invention is the provision of a plurality of transformers, each having a like plurality of like groups of secondary winding networks, comprising three-phase zigzag Y connected phase windings, half of which is arranged to rotate the secondary voltage in one direction with respect to the primary voltage, and the other half of the windings being arranged to rotate the secondary voltages in the other direction with respect to the primary voltage, the primary windings of the transformers being arranged to rotate the two secondary voltage patterns with respect to one another so as to provide symmetrical secondary voltages from the plurality of transformers as a whole.

Figure 2:
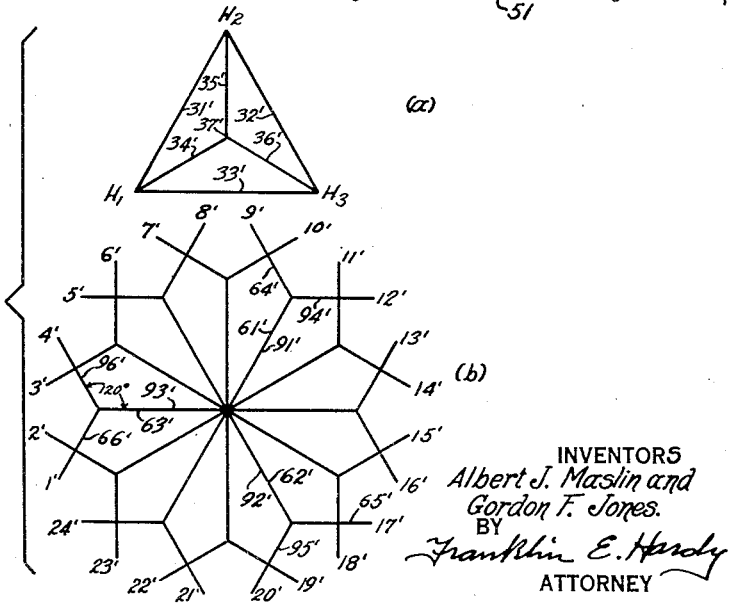

Other objects and advantages of the invention will be apparent from the following description of one preferred embodiment thereof, reference being had to the accompanying drawing, in which:

Figure 1 is a diagrammatic view of circuits and apparatus arranged in accordance with the invention; and Fig. 2 is a vector diagram showing the relation between the voltage vectors in the several windings of the system. The numbers identifying the several vectors in Fig. 2 are primed and otherwise correspond to the windings in Fig. 1 having the voltages represented by the vectors.

Referring to the drawing, three conductors H1, H2 and H3 are illustrated comprising a three-phase alternating-current power supply system for supplying alternating-current energy to the two primary windings of the two illustrated transformer units, the first primary winding consisting of phase windings 31, 32 and 33 connected together in delta and having terminals H1, H2 and H3 connected to the three phase circuit conductors, and the primary winding of the second transformer comprising the three phase windings 34, 35 and 36 connected together in Y and having similarly identified terminals H1, H2 and H3 connected to the corresponding three phase circuit conductors. The secondary windings consist of four groups, the two groups 41 and 42 that are inductively related to the delta connected primary and supply power to the rectifier units 43 and 44, respectively, and the two groups 45 and 46 which supply power to the rectifier units 47 and 48, respectively. Each of the four rectifier units 43, 44, 47 and 48 is provided with a cathode 49 connected to the positive conductor 51 of the unidirectional power circuit from which energy is supplied from the rectifiers to the load. Each of the groups of secondary windings 41, 42, 45 and 46 consists of two three-phase networks of zigzag connected windings, the neutral points of which are connected together by interphase transformer windings 52, 53, 54 and 55, the midpoints of which are connected to the negative conductor 59 of the unidirectional power circuit. One such arrangement of interphase transformers consists in connecting an interphase transformer winding 56 between the midpoints of windings 52 and 55, an interphase transformer winding 57 between the midpoints of windings 53 and 54, and an interphase transformer winding 58 between the midpoints of windings 56 and 57, the midpoint of the winding 58 being connected to the conductor 59. The separate 24 phase units of the group of secondary windings are numbered from 1 to 24 in Fig. 1, and the corresponding vectors are similarly numbered except for being primed in Fig. 2(b), each vector, like each phase winding, being made up of two parts corresponding to the value and direction of voltage in each of the two winding portions comprising the phase winding.

It will be noted that the winding portions connected adjacent to the neutral points have a phase displacement of 30° from the adjacent winding so connected, and that to the ends of these windings other windings are added having a phase displacement of 120° which may have a vector voltage value sufficient to provide either a 7½° or a 22½° displacement to obtain the 24 equally displaced portions. In the arrangement of connections illustrated, a 22½° displacement is provided, so that the vectors branching from the radial vectors cross each other. The branch or outer portion 96' of the vector 4', for example, crossing the branch or outer portion of the vector 3', so that vector 3' will be 7½° above the horizontal, and vector 4' will be 22½° above the horizontal.

Referring to the group of secondary windings 41 comprising the two zigzag connected networks supplying the rectifier 43, it will be noted that the three secondary windings 61, 62 and 63 have a direction indicating that they are on the same winding legs as primary windings 31, 32 and 33, respectively, and that the outer portions of the phase windings 64, 65 and 66, that are connected in series with windings 61, 62 and 63, are, respectively, associated with primary windings 32, 33 and 31. Similarly, the secondary winding portions 71, 72 and 73 are inductively related to primary windings 31, 32 and 33, respectively, and are connected in series with windings 74, 75 and 76 which are related to primary windings 32, 33 and 31, respectively. The phase windings 17 and 21 are shown connected by conductors 78 and 79 to anodes 81 and 82, respectively, of the rectifier 43, it being understood that the other several phase conductors of group 41 are connected to the remaining four anodes of the rectifier 43, and that the six phase conductors of each of the other three groups 42, 45 and 46 are connected in a similar manner to the several anodes of the rectifiers 44, 47 and 48.

It will be noted, by referring to secondary winding groups 41 and 42, that the innermost portion of each phase winding connected to the neutral has the same phase relation as the secondary winding shown immediately above it in the diagram. For example, the winding 91 of group 42, which is inductively related to the primary winding 31, has the same direction as winding 61 of group 41, and windings 92 and 93 have the same directions as the windings 62 and 63, respectively. The winding portions 94, 95 and 96, however, added to the outer ends of winding portions 91, 92 and 93, respectively, are so positioned on winding legs of the core structure as to shift the phase voltage of the individual phases in the opposite direction from windings 64, 65 and 63 shown immediately above in the diagram of Fig. 1. This arrangement of the part windings of each phase is maintained throughout, so that the three-phase network comprising the right-hand portion of group 42 provides for a phase shift in the opposite direction from the network comprising the right-hand portion of group 41. A similar arrangement will be found by comparing the right and left portions of two networks of group 45 with the corresponding two networks comprising group 46.

One outstanding advantage of the circuit and transformer winding connections disclosed is the simplicity of the transformer construction. For example, the secondaries of all transformers are identical and the primaries are simple and interchangeable. The core structures, tanks and bushings for the several transformers are identical, thus greatly simplifying the construction from transformers usually found in such applications. It will be appreciated that by varying the number of transformers used, and the phase angle variation of the individual secondary connections adjusted accordingly, voltage patterns may be readily provided in accordance with the invention for application to 36, 48, or any other number of anodes with evenly spaced voltage vectors.

It will be apparent to one skilled in the art that modifications may be made from the circuits shown within the spirit of our invention, and we do not wish to be limited other than by the scope of the appended claims.

We claim as our invention:

1. A polyphase connection for supplying power to polyphase rectifiers comprising a polyphase power circuit and a plurality of transformers each having a polyphase primary winding connected to said power circuit and each transformer having a similar group of four polyphase secondary networks, each network comprising three phase secondary windings connected in zigzag Y, certain of said secondary networks being connected to rotate the phase of the secondary voltages 22½° in one direction with respect to the primary voltage, and the other of the secondary windings being connected to rotate the secondary voltage 22½° in the other direction with respect to the primary voltage, the primary windings of said transformers being arranged to vary the phase angle pattern of the separate transformers to povide 24 equally spaced symmetrical polyphase secondary voltages from the group of transformers as a whole.

2. In a system for supplying electric power to polyphase rectifiers comprising a polyphase alternating-current power supply circuit and two transformers, one having three phase primary windings connected in delta to said power supply circuit and the other having three phase primary windings connected in Y to said alternating-current power circuit and each transformer having a similar set of four three-phase secondary windings connected in zigzag Y, two of said secondary windings being connected to rotate the phase of the secondary voltages 22½° in one direction with respect to the primary voltage, and the other two of said secondary windings being connected to rotate the secondary voltages 22½° in the other direction with respect to the primary voltage to provide 24 phase voltages corresponding to 24 equally spaced voltage vectors.

ALBERT J. MASLIN.
GORDON F. JONES.